(12) United States Patent
Steinberg et al.

(10) Patent No.: US 10,328,512 B2
(45) Date of Patent: Jun. 25, 2019

(54) METHOD FOR MANUFACTURING AN EFFECTIVE ELECTRIC CONTACT POINT AT THE END OF AN ELECTRICAL LINE

(71) Applicant: NEXANS, Paris (FR)

(72) Inventors: Helmut Steinberg, Stornstein (DE); Jean-Pierre Bergmann, Erfurt (DE)

(73) Assignee: NEXANS, Courbevoie (FR)

(*) Notice: Subject to any disclaimer, the term of this patent is extended or adjusted under 35 U.S.C. 154(b) by 358 days.

(21) Appl. No.: 15/187,076

(22) Filed: Jun. 20, 2016

(65) Prior Publication Data

US 2017/0050253 A1 Feb. 23, 2017

(30) Foreign Application Priority Data

Jun. 23, 2015 (EP) .................................... 15305968

(51) Int. Cl.
*B23K 9/013* (2006.01)
*B23K 26/362* (2014.01)
(Continued)

(52) U.S. Cl.
CPC ............ *B23K 9/0026* (2013.01); *B23K 9/167* (2013.01); *B23K 9/23* (2013.01); *B23K 10/02* (2013.01);
(Continued)

(58) Field of Classification Search
CPC .. B23K 2101/32; B23K 9/0026; B23K 9/013; B23K 15/08; B23K 26/362; B23K 26/354; B23K 10/003
See application file for complete search history.

(56) References Cited

U.S. PATENT DOCUMENTS 3,656,092 A 4/1972 Swengel et al.
3,665,367 A * 5/1972 Keller .................. B23K 1/0056
439/866
(Continued)

FOREIGN PATENT DOCUMENTS

GB 2010134 6/1979
JP 04-089190 A1 * 3/1992
JP 2009-248172 A * 10/2009

OTHER PUBLICATIONS

Machine translation of Japan Patent document No. 04-089,190, Sep. 2018.*

(Continued)

*Primary Examiner* — Geoffrey S Evans
(74) *Attorney, Agent, or Firm* — Sofer & Haroun, LLP

(57) ABSTRACT

Method for manufacturing an electrically effective point of contact on the end of an electrical conductor with a plurality of stranded wires composed of aluminum or an aluminum alloy. At the end of the conductor arranged with the vertical course, initially a holder is placed surrounding the conductor so that the front side of the conductor is exposed and the point is accessible from the top. After the point of the conductor is in an axial direction, on the front surface a heat source of a temperature from 2000° C. and higher heats the surface. The material of the individual wires surrounding oxide layer are melted or steamed away until all the wires of the conductor including the same surrounding oxide layer form a one-piece combined aluminum composed contact part. After that the contact part together with the end of the conductor is cooled.

7 Claims, 1 Drawing Sheet

(51) Int. Cl.
*B23K 10/00* (2006.01)
*B23K 9/00* (2006.01)
*H01R 4/62* (2006.01)
*H01R 13/02* (2006.01)
*B23K 26/21* (2014.01)
*B23K 9/167* (2006.01)
*B23K 9/23* (2006.01)
*B23K 10/02* (2006.01)
*B23K 15/00* (2006.01)
*B23K 26/32* (2014.01)
*B23K 101/32* (2006.01)
*B23K 103/10* (2006.01)
*H01R 4/02* (2006.01)
*H01R 43/02* (2006.01)

(52) U.S. Cl.
CPC ...... *B23K 15/0006* (2013.01); *B23K 15/0093* (2013.01); *B23K 26/21* (2015.10); *B23K 26/32* (2013.01); *H01R 4/625* (2013.01); *H01R 13/025* (2013.01); *B23K 2101/32* (2018.08); *B23K 2103/10* (2018.08); *H01R 4/023* (2013.01); *H01R 43/0207* (2013.01)

(56) References Cited

U.S. PATENT DOCUMENTS

| | | | | |
|---|---|---|---|---|
| 4,038,743 | A | | 8/1977 | DuRocher et al. |
| 4,860,941 | A | * | 8/1989 | Otto ................ B23K 20/007 228/180.5 |
| 4,931,616 | A | * | 6/1990 | Usui ................ B23K 26/0732 219/121.68 |
| 4,966,565 | A | * | 10/1990 | Dohi ................ H01R 4/029 439/874 |
| 6,465,758 | B1 | * | 10/2002 | Ham ................ A61B 17/82 219/121.66 |
| 2010/0299921 | A1 | | 12/2010 | Hall et al. |
| 2014/0182127 | A1 | * | 7/2014 | Kovacs ................ H01R 9/032 29/860 |
| 2015/0001185 | A1 | * | 1/2015 | Kanemaru ............ B23K 9/295 219/75 |
| 2015/0060135 | A1 | * | 3/2015 | Handel ............ B23K 20/2336 174/74 R |

OTHER PUBLICATIONS

Machine translation of Japan Patent document No. 2009-248,172, Sep. 2018.*
Search Report dated Nov. 2015.

* cited by examiner

METHOD FOR MANUFACTURING AN EFFECTIVE ELECTRIC CONTACT POINT AT THE END OF AN ELECTRICAL LINE

RELATED APPLICATION

This application claims the benefit of priority from European Patent Application No. 15 305 968.8, filed on Jun. 23, 2015, the entirety of which is incorporated by reference.

BACKGROUND

Field of the Invention

The invention relates to a method of manufacturing an effective electric point of contact at the end of an electrical line, which comprises a plurality of aluminum or aluminum alloy.

Description of the Related Art

Such a method is essentially described, for example, in EP 2 735 397 A1.

The conductor to be processed by the method according to the invention can be comprised of aluminum or an aluminum alloy. For simplicity's sake, only aluminum is mentioned in the following, however it can also mean an aluminum alloy. The word "stranding" means particularly the concept of "twisting" but also of "contorting" or generally of "holding together."

Conductors of aluminum have been increasingly used as substitutes for copper conductors on the grounds of weight and cost. Principal areas of use of these conductors are, for example, automobile and airplane technology. The lower electrical conductivity of the aluminum as opposed to copper is of no significance for most uses. Problems arise from connecting contact points to the conductor because the aluminum conductors are coated in a poorly electrically conductive oxide layer. This deficiency becomes especially apparent with the existence of a plurality of individual strands, also referred to as strand conductor strands from which each, without special treatment, is surrounded by an unavoidable oxide layer. This problem has been known for a long time and described in many printed publications. They refer specially to processes with which the oxide layers can be broken and/or replaced with additives to make it possible for all wires to have a strand conductor to connect with the electrical current. The oxide remains, but as a harmful part at the end of the conductor. The following five documents are mentioned as examples.

In DE 102 23 397 B4 a method is disclosed in which a contact element establishes a good electric connection connected to a strand conductor composed of aluminum wires. In addition, a tin plated metallic sleeve is initially pushed onto the inner side of the end of the strand conductor. The individual wires would then be tin plated or soldered by means of protective gas welding or ultrasonically on their front side. The surrounding oxide layer of the strand conductor will thereby be broken up. The result is a cover-type tin plating or welding on the end of the strand conductor. Finally, the contact element is pushed on and pressed together with the end of the strand conductor. The cover-type tin plating or welding is excluded from the pressing.

DE 103 46 160 B3 describes a method for contacting a strand conductor completed as an aluminum conductor in which on the end of the aluminum conductor on the inner side is pushed a tin plated, for example copper composed, contact terminal. The completed pipe-shaped contact terminal is placed on the front end of the aluminum conductor by means of ultrasonic tinning or by means of a known metal welding method.

In the method according to DE 103 57 048 A1, a supply of contacting means is placed on the end of an aluminum composed strand conductor and is heated at least up to its melting temperature. Using the contacting means to create a material connection of an electrical contact between the strand conductor and a simultaneously or additionally added or deferred pot shaped contact element. The strand conductor can be dipped in a tin bath for applying the contacting means. At the same time, a part of the strand conductor forms a separation or cutting surface which can be separated or cut off in the tin bath. The contact element is pressed around the strand conductor with strain relieving tension.

DE 10 2011 018 353 A1 describes a method for connecting a contact part with an aluminum composed strand conductor. On the end of the strand conductor is placed a protective sleeve and with the same pressed together. Subsequently, a rotationally symmetrical contact part is welded with the front side of the strand conductor, for example by means of rotational welding. As a result, an intermetallic connection between the contact part and the strand conductor is formed.

DE 10 2011 089 207 A1 describes a method for contacting a strand conductor with individual wires composed of, for example, aluminum with a contact part composed of, for example, copper. In a section of the strand conductor in which the individual wires are exposed, the individual wires are compressed and welded together. For both welding processes an ultrasonic welding method, for example, is used. The part of the oxide layer which surrounds the aluminum composed individual wires of the strand conductor stays in place even when the oxide layer is broken up by the ultrasound.

In DE 2 325 294 A can be found a method for manufacturing a contact end from at least one metallic electrical conductor. In a first embodiment a method with an arrangement for treating an electrical conductor is described, in which the vertically arranged point of the conductor is mounted with the exposed end part down. This arrangement of the conductor is provided because through the heated melted metal the surface tension on the vertical conductor part rises and a pear-shaped little lump-like mass is formed. The little lump can be used to form different contact elements by shaping. In a second embodiment of the method, a pair of conductors with upper facing ends are arranged in a clamp. The end of the conductor is melted through the use of an electric arc so that the melted metal can flow from the exposed ends downward and is collected in a hollow in the clamp. The surface tension affecting the melted mass works together with the form of the hollow so that the mass takes on a round symmetrical configuration.

As mentioned above, EP 2 735 397 A1 describes a method for electrically conductively connecting a copper based contact part with an electrical conductor composed of a plurality of aluminum composed individual wires. A pot-shaped contact part has a one-piece cylindrical sleeve protruding from the part. The sleeve is pushed on the conductor until the front surface of the conductor lies on the bottom of the contact part and is there tightly mounted. After that, on the outside of the contact part, for example, in the area of the bottom of the same, a continual pressure rotating tool is attached, which through friction, raises the temperature of the material of the conductor until it softens and diffuses welding it to the contact part.

OBJECTS AND SUMMARY

The invention is based on the object that the above described method is so arranged to produce a point of contact in which the electrically conductive material of the wires of the conductor are bound in a compact unit.

With this method the point of the conductor, its wires held tightly together by the surrounding holder, is so highly warmed or heated on its front side by a heat source until all the wires on the point of the conductor including the surrounding oxide layer are melted. The melted aluminum binds itself thereby into a continuous body, the contact part exclusively composed of aluminum, and is combined with the aluminum of all the wires of the conductor. The material of the oxide layer of the individual wires is melted away by the high temperature and possibly so stored that nothing is left in the aluminum composed contact part. After the cooling, a working electric point of contact on the point of the conductor has been made, a compact and homogeneous aluminum composed contact element remains. This makes it possible to produce in a simple manner an electrically conductive connection to a, for example, contact element composed of copper, in that it is certain that the entire electrically conductive cross section of the conductor is detected.

The method is advantageously carried out so that the point of the conductor protrudes out of the holder. The heat source can then be simply directed to the front side of the conductor. Any additional covering of the conductor on its peripheral surface is in this case not necessary.

In a second preferred embodiment of the method, the conductor is placed so tightly in the holder so that the front surface lies on the same level as the corresponding edge of the holder. The conductor does not protrude beyond the holder.

Correspondingly, in a third preferred embodiment of the method, the holder can also be placed on the point of the conductor so that it protrudes over the conductor. The holder then surrounds the tip of the conductor at a hollow space and thus, serves a limited function in the manner of a mold for the contact part produced by the heat source.

The heat source can be for example, a plasma light generator, a laser light beam, an electron beam, a TIG (Tungsten-inert-gas) electricity source, or a MSG (metal-protective-gas) electricity source which produce temperatures for example from 2000.degree. C. and higher, by which the oxide layer of the conductor will be semi-evaporated. Those of the different heat sources mentioned can have temperatures up to 3500.degree. C. Thereby a very short timed warming of the point of the conductor of, for example 2 seconds, is sufficient.

The warming or heating time for the Wig method can lie between 2 seconds and 6 seconds. Using laser beam welding and electron beam welding, the welding time can be less than 2 seconds. The laser output must then be selected accordingly and it can preferably be done with a scan system. Advantageously, the melting process can be carried out with a protective gas covering.

For example, the holder can advantageously be made by using two existing clamping elements that tightly surround the end of the conductor upon completion of the clamping. The clamping elements can preferably be composed of copper. With adequate dimensioning the clamping elements can serve additionally as protection from underneath and behind the same part which lie opposite the heat of the heat source, for example for a surrounding insulation of the conductor.

The method is advantageously carried out so that the conductor with the vertical course is tightly placed in the holder. Because of the very short heating of the conductor point, it is also possible to arrange the conductor horizontally or at an angle. The melted aluminum thereby doesn't drop off the conductor point.

After termination of the method, including cooling, a complete aluminum composed point of contact is located on the point of the conductor, with the contact part. It can directly be used as a connection to a contact element. By a later further processing, an oxide layer of the contact part can initially be removed under a protective gas.

BRIEF DESCRIPTION OF THE DRAWINGS

The method according to the invention is explained as an embodiment with the aid of the drawings.

DETAILED DESCRIPTION

Figure 1:
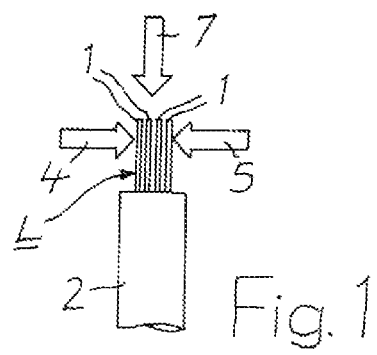
FIGS. 1 and 2 are schematic illustrations of the end of an electrical conductor in two different processing stages.
Figure 2:
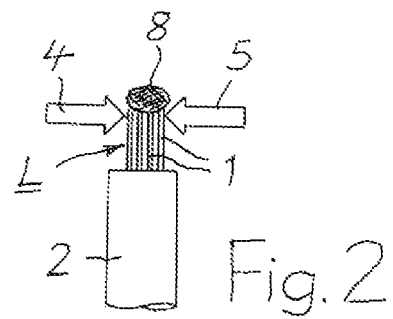
Figure 5:
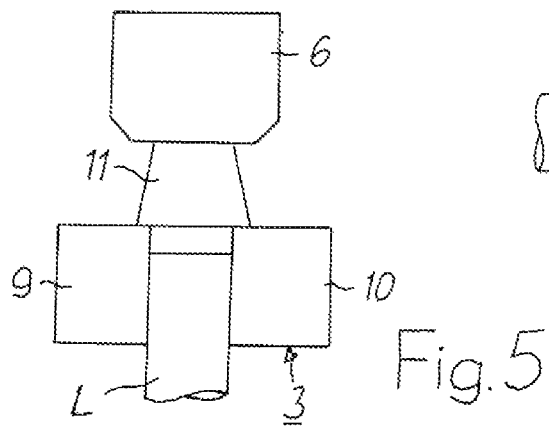
Figure 6:
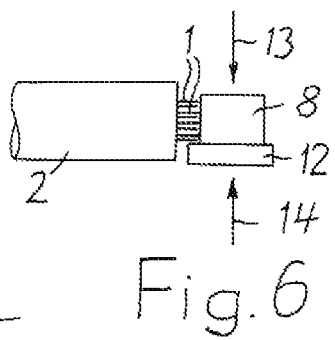
FIG. 6 shows a point of contact between a conductor and a contact element.

The method according to the invention is explained based on FIGS. 1 and 5 with the vertically arranged conductor. Analogously, it can be carried out with the sloping or horizontally running conductor.

In FIG. 1, the end of the wire 1 composed of aluminum having an electrical conductor L is illustrated. The wires 1 are advantageously stranded with each other in Leiter L. The wires are illustrated separated from each other for clarity's sake and are actually only four wires 1. The conductor L is surrounded by an insulation 2 that on the end is exposed and away from the wires 1. The wires 1 are held together and fixed at the end of the conductor L by a holder 3 (FIG. 3) that is indicated by two arrows 4 and 5. Correspondingly, the illustrated drawing is the conductor L arranged with the vertical course. A heat source 6 (FIG. 3) acts on the upward pointing front side which is indicated by the arrow 7.

The heat source acts briefly, for example for 4 seconds on the front surface of the conductor L and in fact as already mentioned, advantageously acts with protective gas cover of the same. The point of the conductor L is warmed at the same time to, for example, 2300° C. so that the aluminum becomes molten. The aluminum of all the wires 1 are thereby bound together into a one-piece homogeneous contact part 8 that remains on the point of the conductor L.

To tightly fasten the conductor L holder 3 is used, advantageously made into one out of two parts 9 and 10 clamping elements. It is composed preferably out of copper. The underlying area, especially the insulation 2 of the conductor L, is screened by the holder 3 or through the clamping element across from the heat source 6.

Figure 3:
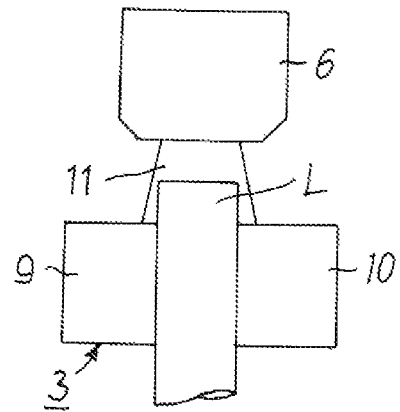
FIGS. 3 through 5 show an arrangement for carrying out the method according to the invention in three different embodiments also schematically illustrated.

In accordance with FIG. 3, the conductor protrudes from the holder 3 with, for example, a length of 4 mm. The distance of the heat source 6 to the holder 3 is dependent on each heat source used. The heat stream emerging from the heat source 6 is shown flowing through a cone shaped edge 11.

Figure 4:
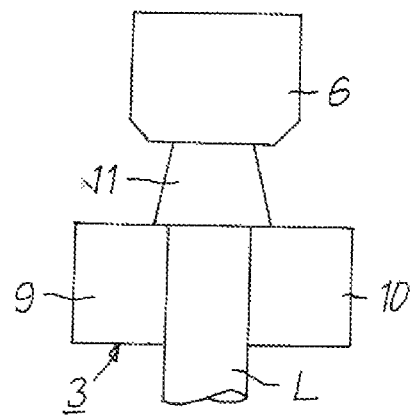

According to FIG. 4 the conductor L is brought into the holder so that the front surface lies at the same level as the upper edge of the holder.

In a third version the conductor L, according to FIG. 4, is fastened so that it protrudes beyond the holder. The contact part 8 then lies inside the holder 3 which limits all around in the manner of a moat.

After the short term warming or heating, the end of the conductor L is, as mentioned, a one-piece homogeneous contact part is formed. The end of the conductor L is then cooled and the holder 3 is removed.

After, the conductor L can be connected with a contact element 12, for example, composed of copper. For this purpose, the contact part 8 is advantageously formed ahead of time into a rectangular object, as is shown in FIG. 4. Contact part 8 and contact element 12 can be welded together. An appropriate arrangement is shown by arrows 13 and 14. For example, an ultrasound welding arrangement can be used.

The invention claimed is:

1. Method for manufacturing an electrically effective point of contact on an end of an electrical conductor, the electrical conductor having a plurality of stranded wires composed of aluminum or an aluminum alloy with exposed ends, with an end of the electrical conductor being arranged vertically along its axial direction with said exposed end of said stranded wires facing upwards, said method comprising:

initially a holder is placed surrounding the end of said vertically arranged conductor so that the front side of the conductor is exposed and accessible from the top, by which after the point of the electrical conductor is heated by a heat source to a temperature of at least 2000° C. such that surrounding oxide layers which surround the individual stranded wires are melted away or vaporized until all the exposed ends of the stranded wires of the electrical conductor, including the same surrounding oxide layers, form a one-piece fused contact part; and cooling the fused contact part together with the end of the electrical conductor.

2. Method according to claim 1, wherein for the melting of the conductor a plasma light generator, or a laser light beam, or an electron beam, or a Tungsten-inert-gas electricity source, or a metal-protective-gas electricity source can be used on the point of the conductor.

3. Method according to claim 2, wherein the melting is carried out in a time period of between one second and six seconds at a temperature up to 3500° C.

4. Method according to claim 1, wherein the conductor is arranged so in the holder that the point protrudes out of the same.

5. Method according to claim 1, wherein the conductor is arranged in the holder so that the contact point lies on the same level as the edge of the holder.

6. Method according to claim 1, wherein the conductor is arranged so in the holder that the holder protrudes beyond the conductor.

7. Method according to claim 1, wherein a clamping element is used for the holder.

* * * * *